Oct. 24, 1950     L. H. FLORA     2,527,124
FASTENING DEVICE
Filed Nov. 8, 1945

INVENTOR.
LAURENCE H. FLORA
BY
Bates, Teare, y McDean
ATTORNEYS

UNITED STATES PATENT OFFICE 2,527,124

FASTENING DEVICE

Laurence H. Flora, Cleveland, Ohio, assignor to Tinnerman Products, Inc., Cleveland, Ohio, a corporation of Ohio Application November 8, 1945, Serial No. 627,395

9 Claims. (Cl. 85—11)

This invention relates to fastening devices and particularly to a device for securing fabric to a supporting panel. It has particular application in motor car manufacture where the inner upholstery is to be secured to the metal body parts.

An object of the present invention is to provide a fastening device which may be positioned on a supporting panel and which will be there self-retaining until the fabric to be supported is later applied, and which will then by a simple operation be caused to engage the fabric and retain it securely. Another object is to provide such a fastener which will be simple in design and hence economical in manufacture and in use.

Figure 2:
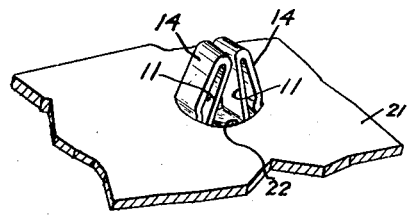
Figure 1:
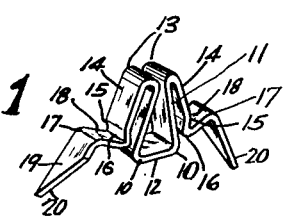
Figure 3:
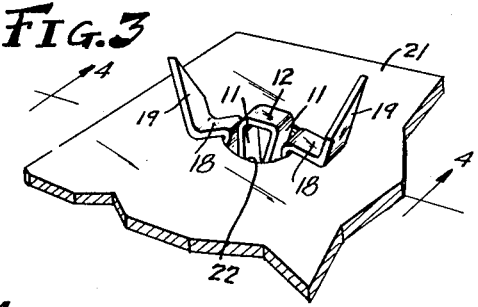
Figure 4:
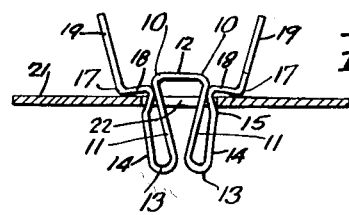
Figure 5:
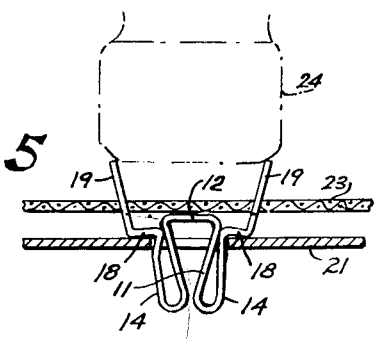
Figure 6:
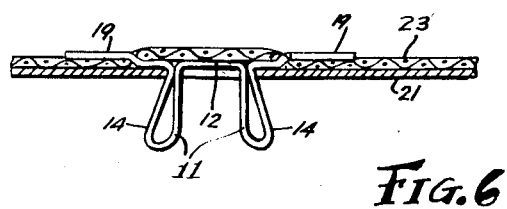
Figure 7:
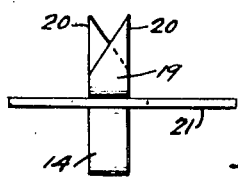

Referring now to the drawings, Fig. 1 is a perspective view of the preferred form of fastener of this invention; Fig. 2 is a rear perspective view of a panel with the fastener applied; Fig. 3 is a front perspective view of the same; Fig. 4 is a longitudinal section of the supporting panel, showing the fastener in edge elevation as indicated by the line 4—4 of Fig. 3; Fig. 5 is a similar view showing the fabric applied to the fastener and about to be secured thereby; Fig. 6 is a similar view showing the panel, fastener and fabric in their final positions; and Fig. 7 is an end elevation of the panel and fastener of Fig. 3.

The fastening device shown in the drawing is preferably made from a strip of sheet metal possessing the desired degree of resilience and ductility. The strip is bent rearwardly intermediately at two adjacent points 10 and 10 to provide two converging arms 11 and a flat intermediate region 12 between them. Each arm is then bent back upon itself or forwardly at 13 forming an arm 14. There are thus provided two flat loops each having an inner portion 11 and an outer portion 14. These outer portions 14 adjacent their forward ends are then bent inwardly slightly to form shoulders 15 and again outwardly at 16 to provide pockets by which the fastener may be self-retaining on a panel. Beyond the bends 16 the strip continues outwardly a short distance providing flat stop portions 18. Then the strip is once more bent forwardly at 17 providing end portions or prongs 19. The prongs 19 are preferably cut to a sharp point 20 so as to pierce easily the applied fabric.

As shown in Figs. 2 to 7 the supporting panel 21 of sheet metal, plywood, fibre board, or the like is provided with a hole 22 large enough to receive the converging loops 14 of the fastener but smaller than the width between the pockets. Thus the fastener may be easily applied with the fingers by inserting the loops 14 through the hole and pressing on the flat central portion 12 until the stops 18 engage the panel, at which time the arms spring outwardly and the pockets engage the periphery of the hole, preventing inadvertent removal therefrom. The position of the fastener on the panel at this time is illustrated in Figs. 2, 3 and 4. This feature of self-retention is an advantageous one as it allows a workman to insert all the necessary fasteners into a panel prior to the application of the fabric, and assures their being ready when needed.

In applying the fabric 23 it need merely be pressed upon the sharpened prongs until it rests against the flat intermediate portion 12. The sharpened prongs easily pierce the material and project therebeyond. At this time the relative positions are as illustrated in Fig. 5. As there shown, the prongs diverge at such an angle as to assure their being easily flattened by a single blow from a tool such as the hammer illustrated in broken lines at 24. As shown in Fig. 6 the prongs 19 are driven flat upon the fabric 23, holding it firmly against the panel 21.

It will be noted that the inner portions of the loops 14 are longer than the outer, whereby the central flat portion 12 projects forwardly beyond the stop portions 18 and in the same direction as the prongs. Thus, as the tool forces the prongs to their final position, contact is made with the central raised portion 12, driving it rearwardly and deforming the loops 14 to an outwardly diverging position, as shown in Fig. 6, and thereby more securely locking the fastener and fabric to the panel. It will be understood that the characteristics of the metal used are such that permanent deformation of the prongs and the loops is effected.

The final configuration of the fastener is as shown in Fig. 6 where it will be noted that the fastener is securely fixed within the hole, that the fabric is tightly held against the front face of the panel, and that a substantially flat surface results. In the usual application the fasteners are disposed near the edges of the fabric and a decorative strip or beading hides the exposed prongs.

Replacement of the fabric can be easily effected by prying up the prongs and again flattening them upon a new piece of fabric. Removal of the fastener itself may be simply accomplished by grasping one of the prongs with an appropriate tool and withdrawing the fastener bodily through the hole.

From the foregoing description it will be apparent that I have devised a fastener that can be economically made and readily applied to a panel in a self-retaining position and that will thereafter support a piece of fabric in a simple and effective manner, and that the act of securing the fabric to the fastener also fixedly locks the fastener in place upon the panel. It will also be apparent that, as the fabric is applied by merely pressing it upon the sharpened prongs, it need not be shifted or twisted in any manner and may be applied simply and quickly in its final desired position.

While I have described the preferred form of the invention as made from flat sheet metal it will be apparent to one skilled in the art that a fastener of this same configuration could be made of wire, round or otherwise in cross section, and that numerous modifications in form and arrangement of parts could be made without departing from the spirit and scope of this invention.

I claim:

1. A fastener for securing sheet material to an apertured support, said fastener comprising an elongated body doubled on itself to provide two converging arms and an intermediate bend, the arms being again doubled on themselves to form loops with inner and outer portions, the free ends of the arms extending inwardly slightly to form shoulders, and then extending sharply outwardly substantially normal to the outer portions of the loops to form stops, and then extending substantially at right angles to project beyond the intermediate bend of the converging arms in mutually diverging directions, the converging loops being adapted to enter the aperture in the support until the stops engage the front surface and the shoulders engage the rear surface thereof, the free ends being pointed to pierce the sheet material placed thereon and adapted to be hammered flat upon the front face of the material, and the intermediate bend projecting forwardly beyond the stops and adapted to be driven rearwardly by a hammering operation to spread the loops to a diverging position, and to flatten the ends against the sheet material.

2. A fastener for securing sheet material to an apertured support, said fastener comprising an elongated body doubled on itself to provide two rearwardly converging arms and an intermediate bend, the arms being doubled forwardly on themselves to form flat loops with inner and outer portions, the outer portions being offset laterally between the loop bends and the intermediate bend to form stops and then continuing with the free ends projecting beyond the intermediate bend, the converging loops being adapted to enter the aperture in the support until the stops engage the front surface thereof, the free ends being pointed to pierce the sheet material placed thereon and adapted to be hammered flat upon the front face of the material, and the intermediate bend normally located forward of the stops and being adapted to be driven rearwardly by the hammering operation to spread the loops to a diverging position.

3. A fastener made of a single strip of sheet material doubled on itself to provide an intermediate region, legs extending downwardly from opposite ends of the intermediate region, legs extending upwardly and connected at their lower ends by return bends to the lower ends of the downward legs, portions extending outwardly from the upward ends of the upwardly extending legs and portions extending upwardly from the outer legs of the outwardly extending parts, the legs extending downwardly from the first-named part converging and serving as a wedge to spread the upwardly extending legs when the intermediate part is forced downwardly.

4. A fastening device comprising a single strip of resilient material convoluted to provide three U-shaped portions connected in series and facing alternately in opposite directions, the arms of the two extreme portions diverging outwardly a short distance and then extending from the outer ends of said outwardly diverged portions in substantially the same direction as that of the arms from the U-bends to the inner ends of the outwardly diverged portions, the arms of the intermediate U converging and being longer than the outer arms of the extreme U's up to the region of the outward divergence thereof, whereby the crest of the intermediate U is normally beyond the plane of the outward divergence so that the forcing of such crest down to such plane serves to spread the fastener whereby it may bind itself against the edge of an opening in a support through which it extends.

5. A fastening device comprising a single strip of resilient material convoluted to provide three U-shaped portions connected in series and facing alternately in opposite directions, the members which constitute both the arms of the intermediate U and the inner arms of the extreme U's converging, the outer arms of the two extreme U's diverging abruptly outwardly a short distance and then continuing in a course which is approximately parallel with said arms, the end portions of such continuing arms being sharpened to form prongs adapted to pass readily through a layer of material, the arms of the intermediate U being longer than the outer arms of the extreme U's up to the region of the outward bend thereof, whereby the crest of the intermediate U is normally beyond the plane of the outward bends so that the forcing of such crest down to such plane serves to spread the fastener whereby it may bind itself against the edge of an opening in a support through which it extends.

6. A fastener for securing sheet material to an apertured support comprising an elongated body having an intermediate head portion, downwardly extending converging legs from opposite ends of the intermediate portion, upwardly extending legs connected by return bends of the lower ends of the downwardly extending legs, outwardly extending portions at the upper ends of the upwardly extending legs and members extending upwardly from the outer ends of said outwardly extending portions, the said intermediate head portion standing normally higher than the outwardly extending portions and said converging legs standing close to the upwardly extending legs adjacent their upper ends, whereby the upwardly extending legs may be spread by the downward forcing of the intermediate portion.

7. A fastener made of a single strip of sheet material doubled on itself in a number of regions to provide the following integral parts, namely, an intermediate portion, two legs extending downwardly from opposite ends of the intermediate portion and converging, two legs extending upwardly and connected at their lower ends by return bends with the lower ends of the downward legs, said upwardly extending legs projecting outwardly a short distance below the crest of the intermediate portion in the unapplied fastener, and upwardly extending portions projecting abruptly from the outer ends of said outward portions.

8. A fastener for securing sheet material to an apertured support, said fastener comprising a body having an intermediate rearwardly extending U-portion and two extreme forwardly extending U-portions, the outer arms of said extreme portions being bent outwardly to provide two stops to engage the face of the support, said outwardly bent parts having prongs directed forwardly and adapted to pierce sheet material and be flattened thereon, the crest of the intermediate portion of the body being normally located forward of the stops.

9. A fastener for securing sheet material to an apertured support, said fastener comprising a body adapted to extend rearwardly partially through the aperture and having an intermediate portion and two resilient U-shaped portions, one arm of each U-shaped portion joining the intermediate portion and the other arm having an outwardly extending shoulder to engage the support for self-retention of the body, and prongs directed forwardly from said shoulders and adapted to pierce the sheet material and be flattened thereupon, the forward intermediate portion of the body being located in advance of the shoulders so that it may be moved rearwardly by the flattening operation, and the outer portions of the body being close enough to the intermediate portion to be engaged and spread by such rearward movement to deform the outer portions to prevent withdrawal from the aperture.

LAURENCE H. FLORA.

REFERENCES CITED

The following references are of record in the file of this patent:

UNITED STATES PATENTS

| Number | Name | Date |
|---|---|---|
| 432,938 | Hamburger | July 22, 1890 |
| 1,031,431 | Dunn | July 2, 1912 |
| 1,817,584 | Rosenberg | Aug. 4, 1931 |
| 1,959,096 | Fernberg | May 15, 1934 |
| 2,035,389 | Knutson | Mar. 24, 1936 |
| 2,436,756 | Larkin | Feb. 24, 1948 |